Sept. 14, 1965  P. JACKSON ETAL  3,205,975
LUBRICATING SYSTEM FOR AN INTERNAL COMBUSTION ENGINE
Filed April 9, 1963  2 Sheets-Sheet 1
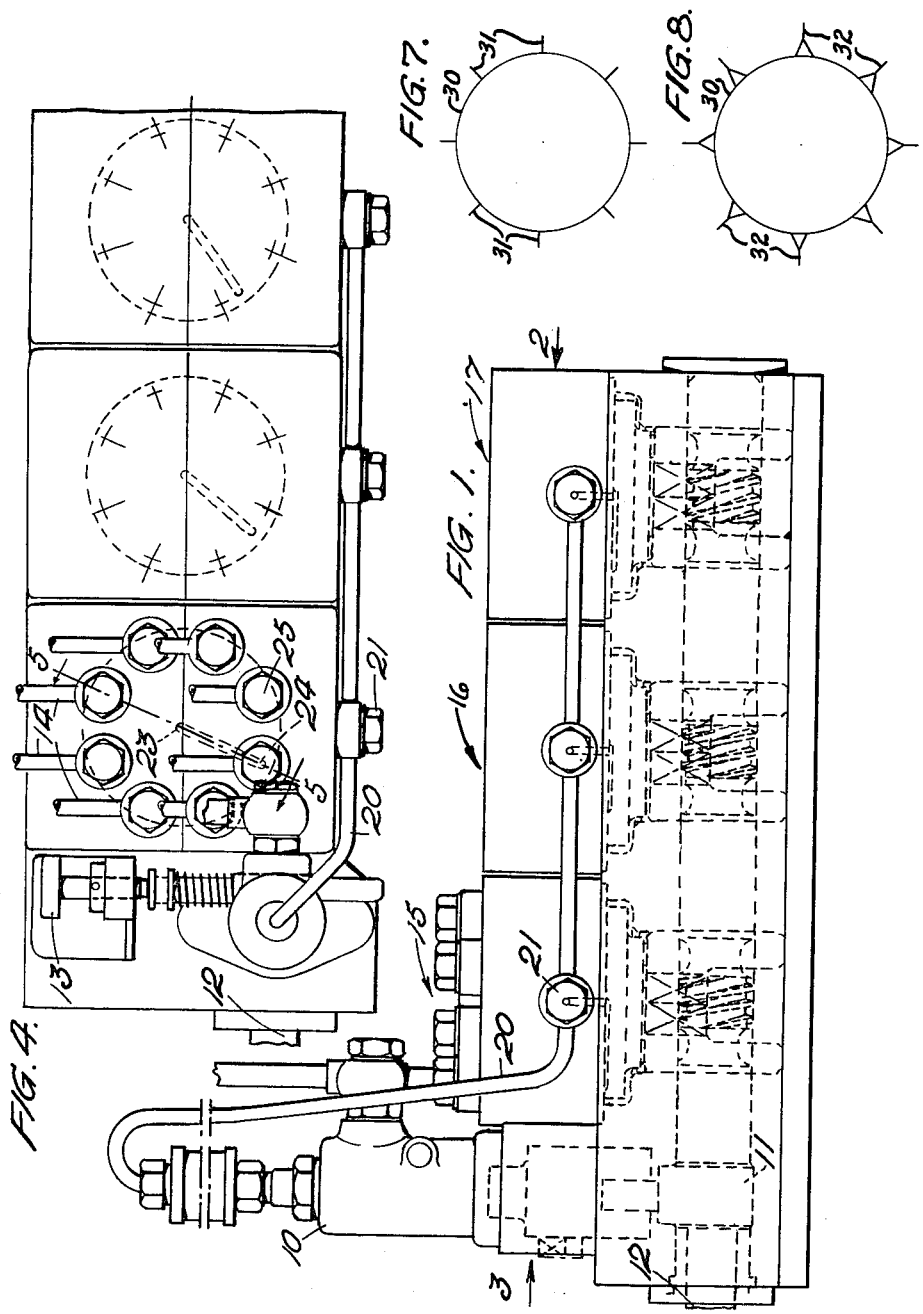
Inventors
Percy Jackson &
William Edward Hoseason

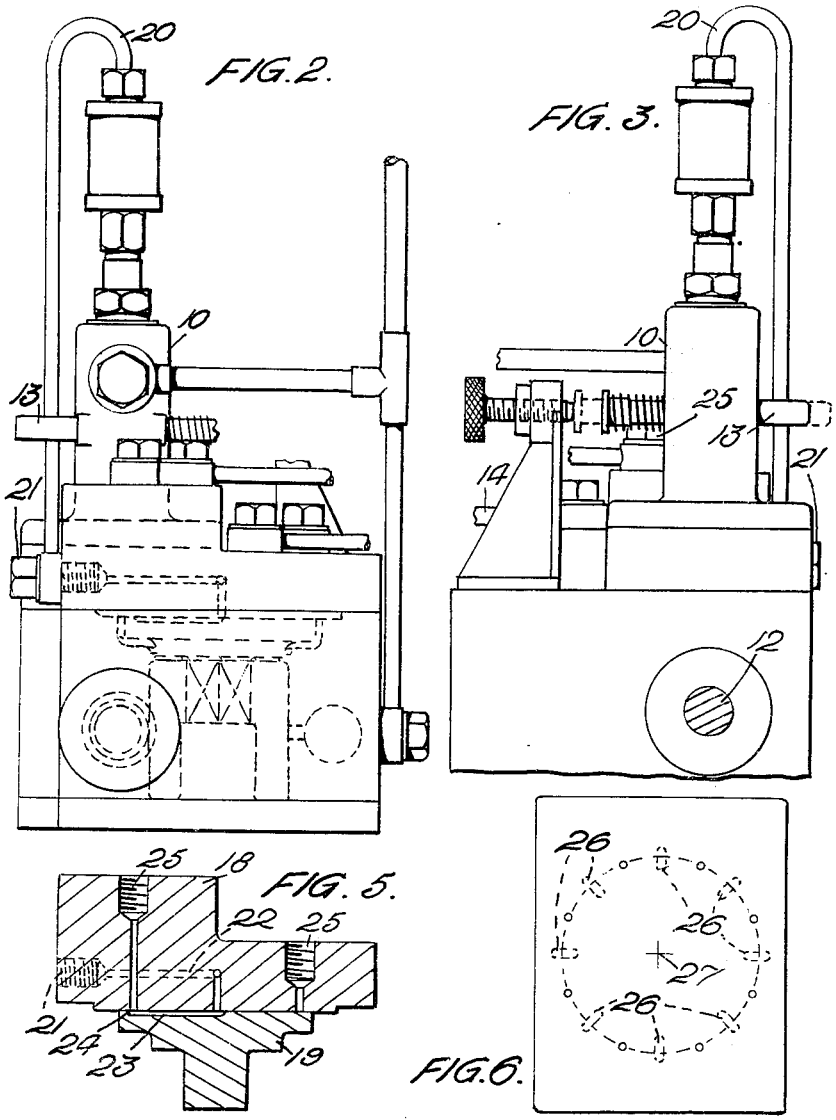

United States Patent Office 3,205,975
Patented Sept. 14, 1965

3,205,975
LUBRICATING SYSTEM FOR AN INTERNAL COMBUSTION ENGINE
Percy Jackson and William Edward Hoseason, Sunderland, England, assignors to William Doxford & Sons (Engineers) Limited, Sunderland, England, a British company
Filed Apr. 9, 1963, Ser. No. 271,797
Claims priority, application Great Britain, Apr. 11, 1962, 14,083/62
9 Claims. (Cl. 184—6)

The invention relates to piston engines and particularly to piston engines in which the cylinders are lubricated through quills projecting into the cylinders.

The lubricant is usually injected into the cylinders through the quills so that the lubricant is injected on to the engine piston between the first and second piston rings on the up stroke of the piston. The injection operation must be timed accurately as if it occurs too soon the upper piston ring scrapes the oil upwards into the combustion space where it is burned and not used for lubrication, and if it is injected too late it does not hit the piston and moreover, in the case of a two cycle engine is scraped down into the scavenge ports to lie and accumulate there and ultimately may be the cause of a scavenge fire.

The amount of lubricant injected through the quills must also be accurately controlled. It is quite common to have for example eight points of lubrication (quills) into the engine cylinder and on, for example, an engine running at 110 r.p.m. and each cylinder consuming 2½ gallons of lubricant per day, the quantity of lubricant which must be delivered through each of the eight quills is about 8 cu. mm. per stroke. It will be appreciated that it is extremely difficult to inject such a small quantity of oil with perfect precision. This is particularly so since the piston will be traversing the cylinder very quickly as it passes the quills and the lubricant must be placed in the correct position on the piston as pointed out above.

It is an object of the invention to avoid or reduce the difficulty described above.

The invention provides an internal combustion piston engine of the kind in which the cylinder is supplied with a lubricant pumped through a multiplicity of nozzles or quills projecting through the cylinder wall and characterised in that lubricant is pumped to each quill or each of several groups of the quills in turn. Thus instead of for example injecting 8 cu. mm. of lubricant through each of eight quills at every stroke of the piston about 64 cu. mm. is injected through each quill once every eight strokes, one quill being fed at each stroke.

The invention further provides a multi-cylinder internal combustion engine of the kind in which each cylinder is lubricated through a multiplicity of nozzles or quills projecting into the cylinder characterised in that the lubricating system comprises a pump which pumps lubricant to the quills of one or more of the cylinders, said pump feeding each of the quills or each of a small group of quills of the or each cylinder in turn and only one quill or small group of quills at any one time. Preferably the pump is timed to feed each quill as the engine piston passes the quill, only one quill or group of quills being fed at each such passage of the piston, and the pump may be so arranged and driven that it executes a separate pump stroke as it feeds each quill.

In one embodiment the arrangement comprises a lubricant distributor having individual outlet connections to each quill or group of quills, having an inlet with a delivery connection from the pump and having a rotatable distributing member with a passageway which, as the member rotates, connects the inlet to each outlet in turn. Preferably the distributor comprises a fixed member and a member rotatable in face to face liquid-tight mating relation with the fixed member, the fixed member having a ring of outlets in its mating face with individual connections to the several quills respectively and an inlet in said face at the centre of the ring and also on the axis of rotation of the rotatable member and the rotatable member having a groove or other passage leading from an inlet in its mating face registering with the inlet on the fixed member to an outlet which registers with each of the members of the said ring in turn as the member rotates.

There may be one such rotary distributor for each cylinder which is fed by the pump.

A specific example of the lubrication system according to the invention for use in a two stroke opposed piston diesel engine or any other reciprocating piston engine will now be described with reference to the accompanying drawings, in which:

FIGURE 1 is a side view of the system,
FIGURE 2 is an end view looking in the direction of the arrow 2 in FIGURE 1,
FIGURE 3 is an end view looking in the direction of the arrow 3 in FIGURE 1,
FIGURE 4 is a plan view of the system,
FIGURE 5 is a section on the line 5—5 in FIGURE 4,
FIGURE 6 shows a top plate arrangement for a double cylinder unit,
FIGURE 7 is a schematic cross-sectional view of a cylinder with the individual quills spaced circumferentially therearound, and
FIGURE 8 is a schematic cross-sectional view of a cylinder with individual groups of two quills spaced circumferentially therearound.

The pump 10 which is a precision type of injection pump is operated at three times the engine speed by a cam 11 on a shaft 12. The shaft 12 is driven from the engine cam shaft. The quantity of oil delivered by the pump 10 at each injection is controlled by a rack 13 in the conventional manner.

The lubrication device shown is designed to lubricate three cylinders 30 (see FIGURES 7 and 8) and each cylinder contains eight quills 31 or groups of quills 32 of the differential needle type fed by feed pipes 14 (see FIGURE 4). The feed pipes of the quills of each cylinder are connected to a separate distributor in the lubrication device. The three distributors are indicated at 15, 16 and 17 in FIGURE 1.

Each distributor comprises a fixed top plate 18 and a rotatable member 19. The rotatable member 19 is driven at 1/24 of the pump speed (1/8 of the engine speed) by a worm drive from the shaft 12.

The pump 10 is connected to the fixed top plate 18 by a delivery pipe 20 and a banjo union 21. The banjo union leads to a through way 22 which emerges from the top plate directly above the axis of rotation of the rotatable member 19 where it connects with a groove 23 in the surface of the member 19. As the rotatable member rotates the outer end 24 of the groove 23 connects in turn with banjo unions 25 carrying the feed pipes 14 to the quills in the engine cylinders.

The three distributors, 15, 16 and 17 are so arranged that the groove 23 in the rotatable members 19 connect with the banjo unions 25 in turn so that only one groove is connected with a banjo union at any one time. As the pump 10 is reciprocated at twenty-four times the speed of each rotatable member and there are eight banjo unions around each rotatable member this arrangement enables each quill to be fed from a separate stroke of the pump 10. The cam 11 is arranged on the shaft 12 so that the pump 10 executes a pumping stroke just as a groove comes opposite a banjo union.

It will also be appreciated from this arrangement that each of the eight quills in a cylinder will receive one injection of lubricant once every eight revolutions of the engine and that each of the eight quills will receive lubricant in turn.

The device described in the above embodiment can be adapted very simply to suit an engine with any number of quills in any number of cylinders, subject to mechanical limitations on the number of strokes the pump can make for one revolution of the cam. For instance, if the pump requires a minimum of 60° of cam rotation to effect one reciprocation, then the maximum number of quills which can be served by the pump is six. If there were six quills in the engine cylinder then the distributor would have six feed pipes 14 equally spaced around the axis of rotation of the rotatable member 19 and the rotatable member would rotate at 1/6 of the engine speed. Where the pump serves only two cylinders it will be driven at twice the engine speed and there will be only two distributors.

Where one pump and two to three distributors serve two or three cylinders which are not equally spaced to each other then there will be injections from the pump which are not correctly timed and these may be connected back to the pump suction, e.g. if two adjacent cylinders of a four cylinder engine have their cranks at 90° apart and are served by one pump and two distributors then the pump must be operated at four times engine speed by either a shaft and cam so geared or by a double cam running at twice engine speed. The pump will then deliver four injections for each revolution of the engine and if the first two are timed correctly for the two cylinders respectively, then the second two injections will not be correctly timed and they will be passed back to the suction side of the pump by cutting a groove in the cover instead of a hole connected to a quill.

This arrangement is shown in FIGURE 6 which shows a top plate for a double cylinder unit. There are spill grooves 26 arranged about the axis 27 of its rotatable member and the lubricant passes back to the suction side of the pump through the spill grooves.

We claim:

1. In an internal combustion engine having a piston working in a cylinder, a lubricating system comprising a multipilicity of quills for injection of lubricant through the cylinder wall at interval saround the circumference thereof and means for pumping lubrciant to each of the quills in turn.

2. In an internal combustion engine having a piston working in a cylinder, a lubricating system comprising a multiplicity of quills for injection of lubricant projecting through the wall of a cylinder at intervals around the circumference thereof, a lubricant pump and a distributor for the pump output with separate outlet connections to individual quills, the distributor being arranged to supply each outlet connection in turn.

3. A lubricating system as claimed in claim 2 in which the quills are arranged in individual groups, separate outlet connections from the distributor to the individual groups of quills, the distributor is arranged to supply lubricant to each group of quills in turn.

4. A lubricating system as claimed in claim 2 and including means for operating the distributor in timed relation with the engine such that only one quill is supplied with lubricant during any one stroke of the piston.

5. A lubricating system as claimed in claim 3 in which only one group of quills is supplied with lubricant during any one stroke of the piston.

6. In a multi-cylinder internal combustion engine having in each cylinder a piston working therein, a lubricating system comprising a multiplicity of quills for injection of lubricant projecting through the wall of each cylinder at intervals around the circumference thereof, a lubricant pump and a distributor with individual connections to the quills and operative to supply lubricant to the quills in succession.

7. A lubricating system as claimed in claim 6 in which the quills are arranged in individual groups and including means for operating the distributor in timed relation with the engine so that each group of quills is fed as the engine piston passes the said groups, and only one group of quills is fed at each such passage of the piston.

8. A lubricating system as claimed in claim 7 and including means for operating the pump in timed relation with the engine so that the pump executes a separate pump stroke as it feeds each group of quills.

9. A multi-cylinder internal combustion engine comprising, in combination
   (a) a multi-cylinder engine with each cylinder having a piston working therein,
   (b) at least two groups of quills for injection of lubricant projecting through the wall of each cylinder and spaced around its circumference thereof,
   (c) a lubricant pump,
   (d) for each cylinder a lubricant distributor having a fixed member and a member rotatable in face to face liquid-tight mating relation with the fixed member, the fixed member having a ring of outlets in its mating face with individual connections to each group of quills of the cylinder respectively, an inlet in said face at the centre of the ring with an inlet connection to the pump which inlet is on the axis of rotation of the rotatable member, the rotatable member having a passageway leading from an inlet in its mating face registering with the inlet on the fixed member to an outlet which registers with each of the members of the said ring in turn as the member rotates,
   (e) a driving connection between the rotatable member of each distributor and the engine arranged so that only one group of quills is supplied with lubricant during any one stroke of the piston and the group of quills is fed as the piston passes the group and
   (f) a driving connection between the pump and the engine arranged so that the pump executes a separate pump stroke as it feeds each group of quills.

References Cited by the Examiner

UNITED STATES PATENTS

| | | | |
|---|---|---|---|
| 410,035 | 8/89 | Siegrist | 184—35 |
| 2,628,636 | 2/53 | Brockman | 184—35 |
| 2,738,861 | 3/56 | Emele et al. | 184—18 X |

LAVERNE D. GEIGER, *Primary Examiner,*

MILTON KAUFMAN, *Examiner,*